(12) United States Patent
Richardson

(10) Patent No.: US 11,724,748 B2
(45) Date of Patent: *Aug. 15, 2023

(54) INSTRUMENT PANEL SUPPORT STRUCTURE

(71) Applicant: Zephyros, Inc., Romeo, MI (US)

(72) Inventor: Henry Richardson, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,073

(22) Filed: Sep. 2, 2022

(65) Prior Publication Data

US 2022/0410980 A1  Dec. 29, 2022

Related U.S. Application Data

(63) Continuation of application No. 16/959,329, filed as application No. PCT/US2019/017670 on Feb. 12, 2019, now Pat. No. 11,440,595.

(60) Provisional application No. 62/629,391, filed on Feb. 12, 2018.

(51) Int. Cl.
  *B62D 25/14*  (2006.01)
  *B62D 27/02*  (2006.01)
  *B62D 29/00*  (2006.01)

(52) U.S. Cl.
  CPC ........... *B62D 25/145* (2013.01); *B62D 27/02* (2013.01); *B62D 29/001* (2013.01)

(58) Field of Classification Search
  CPC ..... B62D 24/145; B62D 27/02; B62D 29/001
  See application file for complete search history.

(56) References Cited

U.S. PATENT DOCUMENTS

| 8,715,555 B2* | 5/2014 | Love | B29C 70/521 |
| | | | 428/195.1 |
| 10,570,258 B2 | 2/2020 | Richardson et al. | |
| 11,110,670 B2 | 9/2021 | Richardson et al. | |
| 2003/0193207 A1 | 10/2003 | Ito | |
| 2004/0056463 A1* | 3/2004 | Marks | B62D 25/145 |
| | | | 280/752 |
| 2004/0108744 A1* | 6/2004 | Scheib | B62D 25/142 |
| | | | 296/70 |
| 2004/0262954 A1* | 12/2004 | Scheib | B62D 29/004 |
| | | | 296/193.02 |

(Continued)

FOREIGN PATENT DOCUMENTS

| CN | 103661632 A | 3/2014 |
| CN | 104781060 A | 7/2015 |

(Continued)

OTHER PUBLICATIONS

EP Communication dated Aug. 3, 2022, Application No. 19707589.8.

(Continued)

*Primary Examiner* — Lori L Lyjak
(74) *Attorney, Agent, or Firm* — The Dobrusin Law Firm, PC

(57) ABSTRACT

An instrument panel assembly comprising: a crossmember (2) including a first beam (4) and a second beam (6), a center support assembly (8) with a first structural arm (30), a second structural arm (32), and a center support bracket (34); wherein the first beam (4) is hollow and has a larger diameter than the second beam (6), and the second beam (6) is adapted to slide into the first beam (4).

15 Claims, 9 Drawing Sheets

(56) References Cited

U.S. PATENT DOCUMENTS

| | | | |
|---|---|---|---|
| 2010/0327627 A1* | 12/2010 | Leanza | B62D 25/145 |
| | | | 296/190.01 |
| 2015/0129116 A1 | 5/2015 | Richeton et al. | |
| 2015/0284035 A1 | 10/2015 | Reese | |
| 2015/0344080 A1* | 12/2015 | Davos | B62D 27/02 |
| | | | 296/203.02 |
| 2018/0036970 A1 | 2/2018 | Chmielewski et al. | |
| 2019/0077453 A1* | 3/2019 | Kong | B62D 25/145 |
| 2020/0157293 A1 | 5/2020 | Chmielewski et al. | |
| 2021/0237377 A1 | 8/2021 | Richardson | |
| 2022/0080912 A1 | 3/2022 | Barz | |
| 2022/0097776 A1 | 3/2022 | Royston | |

FOREIGN PATENT DOCUMENTS

| | | | |
|---|---|---|---|
| CN | 109263728 A * | 1/2019 | |
| DE | 10121402 A1 | 11/2002 | |
| DE | 10124248 A1 | 11/2002 | |
| DE | 102010020706 A1 * | 11/2011 | B62D 25/145 |
| DE | 102013218353 A2 | 3/2014 | |
| DE | 102012021493 A1 * | 4/2014 | B29C 45/1418 |
| DE | 102012021493 A1 | 4/2014 | |
| EP | 0990578 A2 | 4/2000 | |
| EP | 1820677 A1 | 8/2007 | |
| EP | 3162671 A1 * | 5/2017 | B62D 25/145 |
| EP | 3162671 A1 | 5/2017 | |
| GB | 2363098 A | 12/2001 | |
| JP | H05238421 A | 9/1993 | |
| WO | 0017034 A1 | 3/2000 | |
| WO | 03/045763 A1 | 6/2003 | |
| WO | WO-2015195807 A1 * | 12/2015 | B32B 1/08 |
| WO | 2020/198139 A1 | 10/2020 | |
| WO | 2020/205192 A1 | 10/2020 | |
| WO | 2020/214769 A1 | 10/2020 | |
| WO | 2021/080917 A1 | 4/2021 | |

OTHER PUBLICATIONS

Chinese First Office Action dated Jun. 2, 2022, Application No. 201980012204.8.

PCT International Search Report & Written Opinion dated May 20, 2019, Application No. PCT/US2019/017670.

Chinese Decision of Rejection dated Apr. 22, 2023, Application No. 201980012204.8.

Brazil Preliminary Office Action dated May 9, 2023, Application No. 112020014659-5.

* cited by examiner

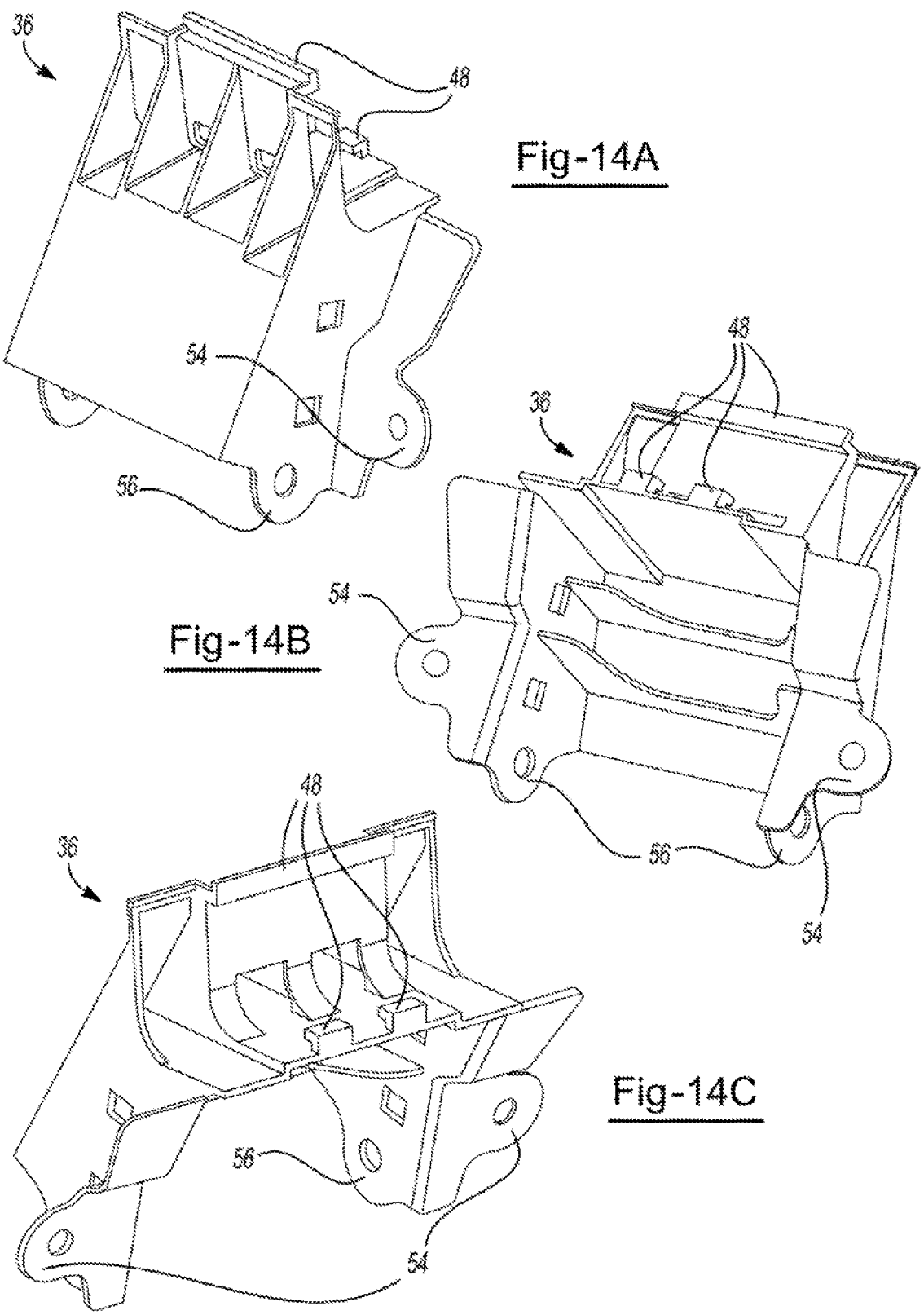

INSTRUMENT PANEL SUPPORT STRUCTURE

FIELD

The present teachings generally relate to vehicle interior support structures, particularly to instrument panel support structures having pultruded crossmembers.

BACKGROUND

Vehicles include a plurality of interior components mounted in the forward portion including steering column supports, driver and passenger knee bolsters, vehicle instruments, air bags, etc. Typically, the instrument panel is comprised of a metal beam assembly fastened to and extending between the front pillars of the vehicle. During the manufacturing process of an instrument panel structure, the metal beam and various components must be welded together to form the instrument panel support. The typical metal instrument panel is heavy with insufficient rigidity and bend strength and requires costly and time-consuming methods of formation and attachment (e.g. laser welding). Furthermore, as the transportation industry continues to prioritize vehicle light-weighting, large metal structures such as instrument panel supports present additional challenges in such efforts.

It would therefore be desirable to have a structural support which has a reduced weight, an increased stiffness, an increased bending strength, and a decreased cost that eliminates the need for welding steps.

SUMMARY

The present teachings meet one or more of the present needs by providing an instrument panel that replaces a steel laser welded assembly with pultruded and molded components, reducing weight by approximately half, and increases stiffness by at least 15% and bending strength by at least 100%. Additionally, the present teachings provide for a less costly alternative to known light weight steel structures (e.g. magnesium). The desired instrument panel may include pultruded crossbeams and molded polymeric mounting features. The pultruded beams and polymeric brackets may reduce weight, increase rigidity and bend strength, while lowering production cost and the time consuming steps of laser welding.

The present teachings meet one or more of the present needs by providing an instrument panel assembly comprising a crossmember including a first beam and a second beam; a center support assembly including a first structural arm, a second structural arm, and a center support bracket; and a steering column support. The first beam may be hollow and has a larger diameter at its widest cross section than the second beam, and the second beam is adapted to slide into and be received by the first beam.

One or more of the first beam and the second beam may include one or more longitudinal channels on an exterior surface. One or more longitudinal channels of the first beam may form one or more internal protrusions on an inner surface of the first beam. The first structural arm of the center support assembly and the second beam may complement each other when inserted into the first beam, engaging one or more internal protrusions of the first beam, and filling a portion of an interior of the first beam. The second structural arm engages one or more longitudinal channels on the second beam with one or more interlocking features, the one or more interlocking features fit inside the one or more longitudinal channels, securing the second structural arm to the second beam.

The steering column support includes a first portion and a second portion, the first portion and the second portion both include one or more interlocking features that engage one or more longitudinal channels on the first beam, connecting the steering column support to the crossmember. The instrument panel assembly may include a plurality of positioning brackets. The instrument panel assembly may include a plurality of molded polymeric positioning brackets. The instrument panel assembly may include a first portion and second portion of the steering column support that comprise a molded polymeric material. The first structural arm and the second structural arm may comprise a molded polymeric material. The instrument panel assembly may include two interlocking features that occupy the same of the one or more longitudinal channels at a same location. The instrument panel assembly may include one or more mounting brackets. The instrument panel assembly may include one or more mounting arms.

The plurality of positioning brackets and the one or more mounting arms may connect and support one or more instrument panels, one or more dash panels, one or more knee guards, a glove box, or a combination thereof. The center support bracket may be made of steel. The center support bracket may comprise a molded polymeric material. The first beam may overlap the second beam by about 1 inch to about 10 inches. The first beam may overlap the second beam by about 2 inches to about 7 inches. The first and second beam are formed of a pultruded polymeric material.

The teachings herein further provide for an instrument panel assembly comprising a crossmember including first pultruded beam and second pultruded beam, wherein the first pultruded beam includes a hollow portion that receives a portion of the second pultruded beam. The instrument panel assembly may include a plurality of injection molded support arms adapted for mating with the first and second pultruded beams.

The teachings herein also provide for a method for forming an instrument panel comprising pultruding a first beam, pultruding a second beam, molding a plurality of support arms, and connecting the first and second beams to the plurality of support arms.

The teachings herein provide for a structural support structure that incorporates crossmembers and molded polymeric brackets and supports. The combination of pultruded composite and molded polymeric structures provide a resulting instrument panel that has a reduced weight and increased strength at a lower price than alternative light-weight steel materials (e.g. magnesium).

BRIEF DESCRIPTION OF THE DRAWINGS

FIG. 14A-C illustrates various views of a mounting bracket.

DETAILED DESCRIPTION

Figure 1:
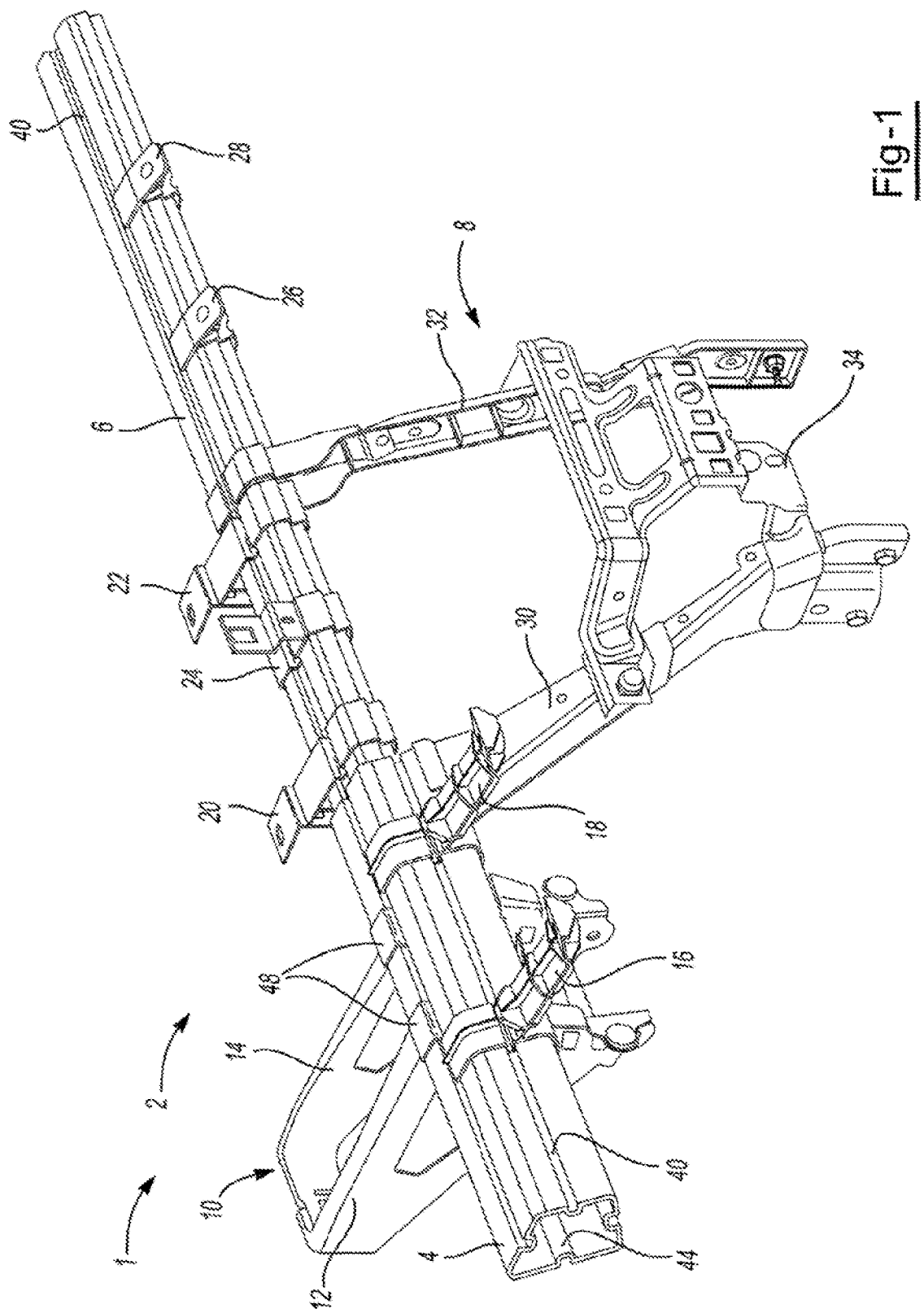
FIG. 1 is a perspective view of the instrument panel support structure.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Ser. No. 62/629,391, filed Feb. 12, 2018, the contents of that application being hereby incorporated by reference herein for all purposes.

The present teachings relate to a structural support system. The structural support system may be comprised of one or more pultruded structures. The structural support system may be used for structural reinforcement of transportation vehicles, particularly automobiles, boats, air planes, trains, space craft, and the like. The structural support system may include pultruded support beams in addition to thermoplastic molded components.

The structural support system may be an instrument panel assembly. The instrument panel assembly may function to provide structural reinforcement to a portion of a vehicle, spanning from one side of the vehicle to another opposing side of the vehicle. The instrument panel assembly may also function to provide a mounting means for a dash board, instruments, steering column, the like, or a combination thereof. The instrument panel assembly may be located at the forward portion of the vehicle. The instrument panel assembly may include a crossmember and a plurality of supports and brackets.

The instrument panel assembly may include a crossmember. The crossmember may function to provide structural reinforcement to the vehicle and provide a mounting means for instruments, panels, vehicle components, the like, or a combination thereof. The crossmember may span across the width of the vehicle. For example, the crossmember may be positioned between the driver side and the passenger side of a vehicle. The crossmember may be made of a pultruded and/or polymeric composite material, a metallic material, a molded polymeric material, or a combination thereof. For example, the crossmember may comprise a pultruded composite material to increase strength and decrease weight. The crossmember may be comprised of two crossbeams. The two crossbeams may be in an overlapping relationship. A first beam may have a larger diameter than the second smaller beam. The first beam may be positioned over the second beam by at least 6 inches, such that the second beam is inserted into the first beam in a telescoping fashion. The first beam and second beam may be connected to one another, and may span the entire length of the structure which is being reinforced. Both the first beam and the second beam may include longitudinal channels on one or more exterior surfaces.

The crossmember may include a first beam. The first beam may function to support the steering column support, the center support bracket, one or more positioning brackets, one or more mounting arms, one or more mounting brackets, one or more support arms, the second beam, the like, or any combination thereof. The first beam may be formed of one or more of a pultruded composite material, a metallic material, a polymeric material, or a combination thereof. For example, the first beam may be made of a pultruded composite material. The first beam may have a square cross section, a rectangular cross section, quadrilateral cross section, triangular cross section, circular cross section, polygonal cross section, or any suitably shaped cross section. The first beam may be substantially hollow. The first beam may be adapted to receive the second beam.

The crossmember may include a second beam. The second beam may function to provide support to the support system. The second beam may be connected to the steering column support, the center support bracket, a plurality of positioning brackets, one or more support arms, the first beam, the like, or any combination thereof. The second beam may be formed of one or more of a pultruded composite material, a metallic material, a polymer material, or a combination thereof. For example, the second beam may be made of a pultruded composite material. The second beam may be substantially hollow. The second beam may be substantially solid. The second beam may have a square cross section, a rectangular cross section, quadrilateral cross section, triangular cross section, circular cross section, polygonal cross section, or any suitably shaped cross section. The second beam may have substantially the same cross-sectional shape as the first beam. The second beam may have a different cross-sectional shape than the first beam. In another example, the second beam may have a cross-section which complements the internal portion of the first beam. The second beam may have a smaller diameter than the first beam. The second beam may be adapted to be inserted into a hollow cavity formed within the first beam. For example, the first beam and the second beam may be connected to one another in an overlapping relationship. The second beam may be inserted about 1 inch to about 10 inches or more into a cavity formed in the first beam. The first beam and the second beam may be connected to one another, forming the entire length of the crossmember.

The crossmember may include one or more longitudinal channels on the exterior of each beam. The longitudinal channels may function as a mounting means for attaching support brackets, positioning brackets, mounting brackets, the like, or a combination thereof. The crossmember may include one or more, two or more, three or more, four or more, five or more, six or more or even seven or more longitudinal channels. The crossmember may include eight or less, seven or less, six or less, five or less, or even four or less longitudinal channels. For example, the crossmember may include at least one longitudinal channel for every exterior side of the first beam and the second beam.

The crossmember may include longitudinal protrusions on the interior of each beam, corresponding with the longitudinal channels. The internal protrusions may function as a mounting means for attaching the first beam and the second beam together, attaching the first structural arm with the first beam, attachment of various other brackets and mounts, the like, or a combination thereof. The crossmember may include one or more, two or more, three or more, four or more, five or more, six or more, or even seven or more internal protrusions. The crossmember may include eight or less, seven or less, six or less, five or less, or even four or less internal protrusions. For example, the crossmember may include one internal protrusion for each longitudinal channel present on the exterior of the crossmember. In another example, the crossmember may include at least one internal protrusion for each side of the crossmember.

The crossmember may be connected with one or more supports. The one or more supports may function to brace the crossmember within the passenger compartment of a vehicle while providing rigidity to the structure. The one or more supports may be connected to the crossmember via the one or more longitudinal channels or protrusions. The one or more supports may include one or more, two or more, three or more, four or more, or even five or more supports. The one or more supports may be eight or less, seven or less, six or less, five or less, four or less, or even three or less supports. The one or more supports may be metallic, composite, polymeric, or a combination thereof. For example, the one or more supports may be made of a molded thermoplastic material. Each of the one or more supports may have a specific portion of the instrument panel assembly which the support braces. For example, one or more of the supports may be a center support that connects to the crossmember and a portion of the vehicle.

The instrument panel assembly may include a center support assembly. The center support assembly functions to connect the crossmember to the vehicle and provide structural reinforcement to the instrument panel assembly. The center support assembly may include a first structural arm, a second structural arm, and a center support bracket. The first structural arm and the second structural arm may connect the vehicle and the crossmember to one another. The center support bracket may connect the first structural arm and the second structural arm to one another.

The center support assembly may include a first structural arm and a second structural arm. The first structural arm and the second structural arm may function to connect the crossmember with the vehicle and provide support, strength, and rigidity to the instrument panel assembly. The first structural arm and the second structural arm may be made of steel, composite, thermoplastic, or a combination thereof. The structural arms may be molded, pultruded, or extruded. For example, the first structural arm and the second structural arm may be made of a molded thermoplastic material. The first structural arm and the second structural arm may be connected to the crossmember with mechanical fastening means, chemical fastening means, or both. The first structural arm and the second structural arm may be connected by the center support bracket.

The center support assembly may include a center support bracket. The center support bracket may function to improve rigidity and strength by connecting the first structural arm and second structural arm together. The center support bracket may be made of steel, a polymeric material, a composite material, or a combination thereof. For example, the center support bracket may be made of steel. The center support bracket may be connected to the first structural arm and the second structural arm by a mechanical means (e.g. fasteners), chemical means (e.g. adhesive), or both.

The instrument panel assembly may include a steering column support. The steering column support may function to provide reinforcement for a steering column. The steering column support may be made of steel, a polymeric material, a composite material, or a combination thereof. The steering column support may be molded, pultruded, extruded, or stamped. For example, the steering column support may be made of a molded thermoplastic material. The steering column support may be comprised of a first portion and a second portion. The first portion and the second portion of the steering column support may be formed independently, and, when connected together, form the steering column support. The steering column support may attach to the crossmember at the first beam, the second beam, or both. The steering support column may include interlocking features which may function to connect the steering support column to the longitudinal channels of the crossmember.

The instrument panel assembly may include one or more positioning brackets. The one or more positioning brackets may function to position the instrument panel within the vehicle and/or position instruments, dash panels, the like, or a combination thereof. The instrument panel assembly may include one or more, two or more, three or more, four or more, five or more, six or more, seven or more, eight or more, or even nine or more positioning brackets. The instrument panel assembly may include ten or less, nine or less, eight or less, seven or less, six or less, five or less, or even four or less positioning brackets. The one or more positioning brackets may be made of a composite material, a polymeric material, a metallic material, or a combination thereof. For example, the one or more positioning brackets are made of a molded thermoplastic. In another example, one of the one or more positioning brackets may be made of a thermoplastic, and a second of the one or more positioning brackets may be made of steel. The one or more positioning brackets may include interlocking features to engage the longitudinal channels of the first beam, the second beam, or both. Similarly, the instrument panel assembly may include mounting arms in addition to the positioning brackets.

The instrument panel assembly may include one or more mounting arms. The one or more mounting arms may function to position the instrument panel within the vehicle and/or position instruments, dash panels, the like, or a combination thereof. The instrument panel assembly may include one or more, two or more, three or more, four or more, or even five or more mounting arms. The instrument panel assembly may include six or less, five or less, or even four or less mounting arms. The one or more mounting arms may be made of a composite material, a polymeric material, a metallic material, or a combination thereof. For example, the one or more mounting arms may comprise a molded thermoplastic material. In another example, one of the one or more mounting arms may be made of a thermoplastic, and a second of the one or more mounting arms may be made of steel. The one or more positioning brackets may include interlocking features to engage the longitudinal channels of the first beam, the second beam, or both. Similarly, the instrument panel assembly may include mounting brackets in addition to the mounting arms.

The instrument panel assembly may include one or more mounting brackets. The mounting brackets may function to mount the instrument panel assembly within the vehicle. The instrument panel assembly may include one or more, two or more, three or more, four or more, or even five or more mounting brackets. The instrument panel assembly may include six or less, five or less, four or less, three or less, or even two or less mounting brackets. The one or more mounting brackets may be made of a composite material, a polymeric material, a metallic material, or a combination thereof. For example, the one or more mounting brackets may be made of a molded thermoplastic material. In another example, one of the one or more mounting brackets may be made of a thermoplastic, and a second of the one or more mounting brackets may be made of steel. The one or more mounting brackets may include interlocking features to engage the longitudinal channels of the first beam, the second beam, or both. The mounting brackets may include a plurality of mounting tabs. For example, the one or more mounting brackets may include two mounting tabs along the longitudinal axis, and two mounting tabs that are perpendicular to the longitudinal axis in order to provide a variety of mounting positions.

FIG. 1 illustrates a perspective view of one example of the instrument panel support 1. The instrument panel support 1 includes a crossmember 2 comprising a first beam 4 and a second beam 6. The first beam 4 and the second beam 6 are shown as hollow structures with longitudinal channels 40 spanning their entire lengths. The first beam 4 is connected to the second beam 6 in an overlapping relationship. The first beam 4 is connected to the steering column support 10 and the first structural arm 30 of the center support assembly 8. The first beam 4 is shown having longitudinal channels 40 and internal protrusions 44. The steering column support 10 includes interlocking features 48 which attach to the first beam 4 by sliding into the longitudinal channels 40. The second beam 6 and a portion of the first structural arm 30 of the center support assembly 8 are received within the first beam 4, such that the second beam 6 and the first structural arm 30 occupy a portion of the interior of the first beam 4 (See also FIGS. 2 and 13). The second beam 6 is connected to the second structural arm 32 of the center support assembly 8. The second structural arm 32 interlocks with the exterior of the second beam 6, and the interlocking features 48 of the second structural arm 32 engage the longitudinal channels 40 of the second beam 6. The first structural arm 30 and the second structural arm 32 are connected together by the center support bracket 34, forming the center support assembly 8. The crossmember includes mounting arms 16, 18 and positioning brackets 20, 22, 24, 26, 28 which engage the longitudinal channels 40 of the crossmember with their interlocking features 48. The positioning brackets and the mounting arms are used to attach and position pieces of the dash board and panels, as well as position the instrument panel within the vehicle.

Figure 2:
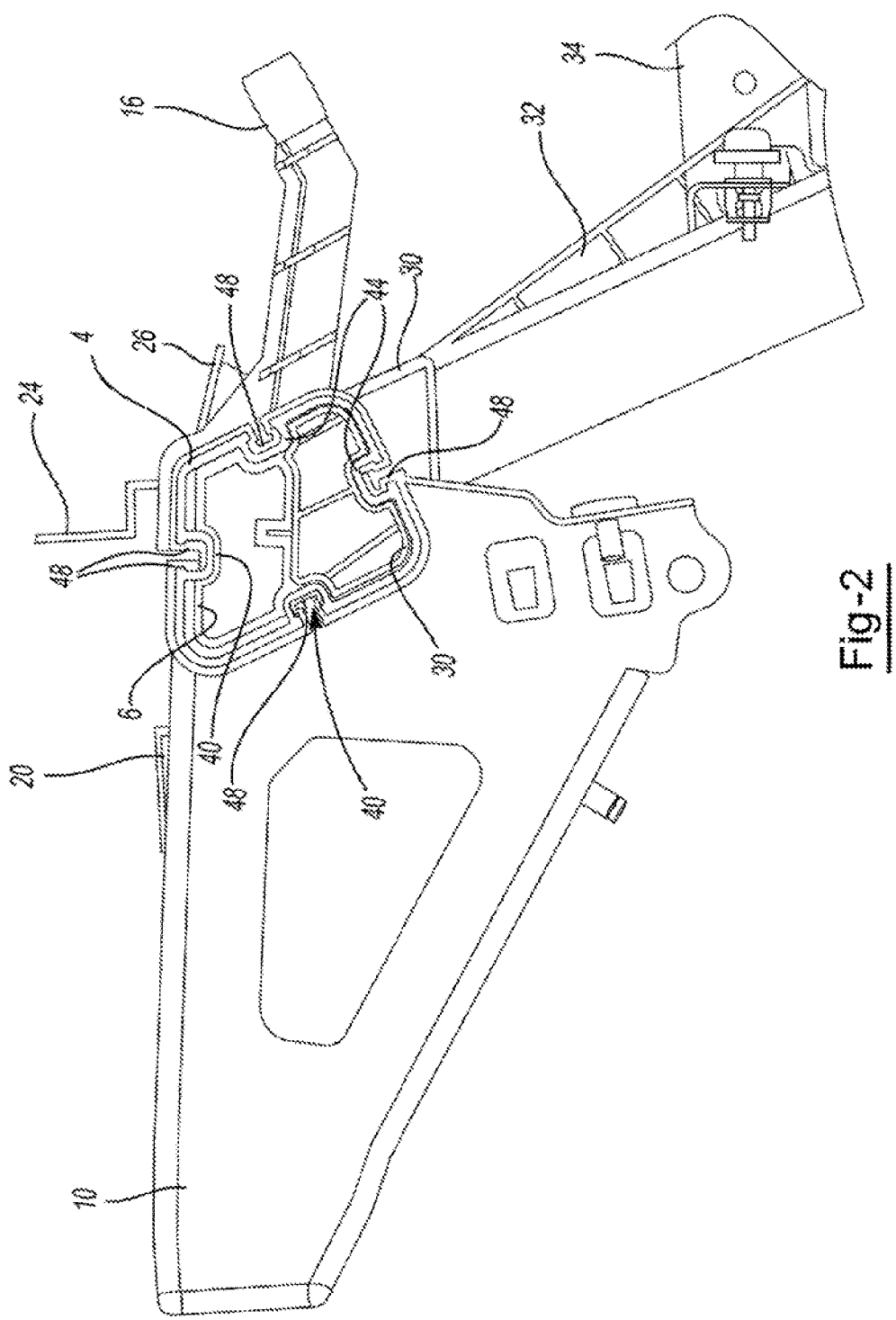
FIG. 2 illustrates a side view of the instrument panel support structure.

FIG. 2 illustrates an end view of the instrument panel assembly 1. The steering column support 10 is shown with its interlocking features 48 engaged into longitudinal channels 40 on the top, left side, and bottom of the first beam 4. The second beam 6 and the first structural arm 30 are shown within the interior of the first beam 4, engaging the internal protrusions 44 with their respective longitudinal channels, occupying the hollow portion of the first beam 4. Mounting arms 16 are shown engaging the longitudinal channels on the top, right side, and bottom of the first beam 4 with its interlocking feature 48.

Figure 3:
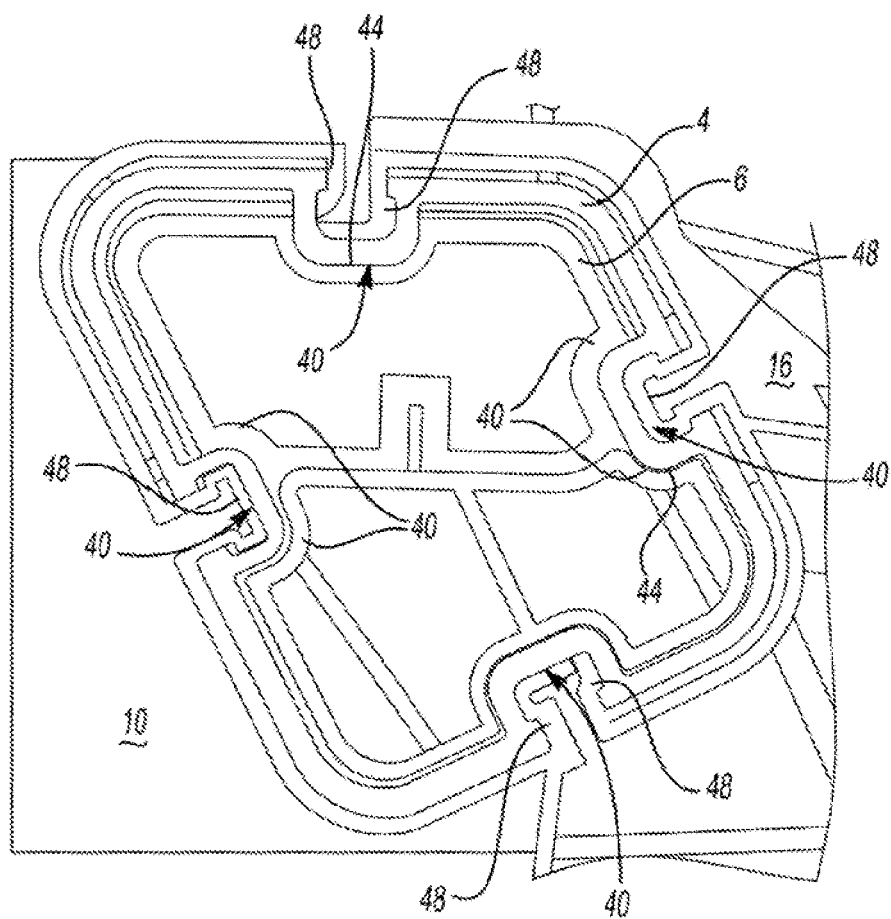
FIG. 3 is a close up of the end view of the instrument panel support structure of FIG. 2.

FIG. 3 illustrates a close up of the end view presented in FIG. 2. The second beam 6 and the first structural arm 30 are configured to be placed within the first beam 4. The longitudinal channels 40 of the second beam 6 and the first structural arm 30 engage the internal protrusions 44 of the first beam 4. The longitudinal channels 40 on the exterior of the first beam 4 also form the internal protrusions 44 on the interior of the first beam. The internal protrusions 44 engage the second beam 6 and the first structural arm 30 which have been adapted to slide inside the first beam 4. The second beam 6 and the first structural arm 30 are designed to complement each other and be positioned together in the hollow portion of the first beam.

Figure 4:
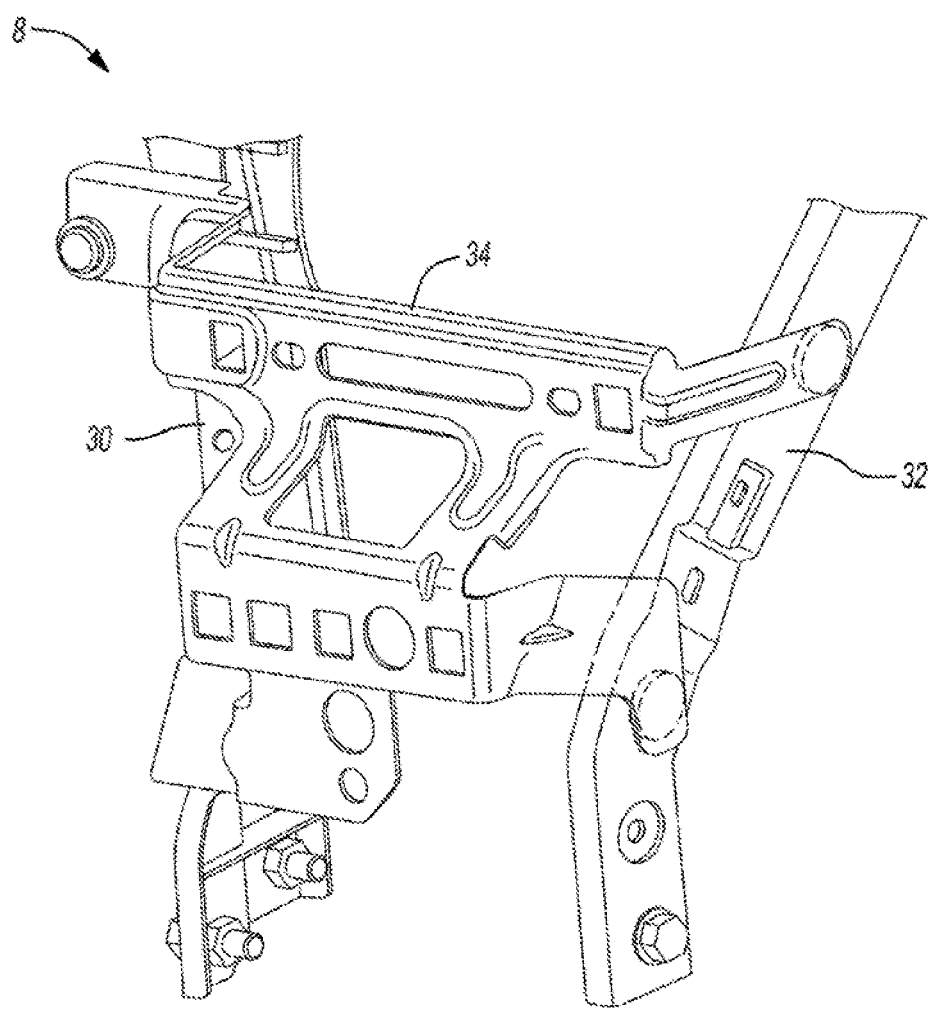
FIG. 4 illustrates a perspective view of the center support assembly.

FIG. 4 illustrates a perspective view of the center support assembly 8. The center support assembly 8 includes a first structural arm 30 and a second structural arm 32 connected together by a center support bracket 34. The center support assembly provides support to the instrument panel assembly by connecting to the vehicle and the crossmember. The center support bracket 34 may be attached to the first structural arm 30 and the second structural arm 32 by a mechanical means, an adhesive means, or both.

Figure 5:
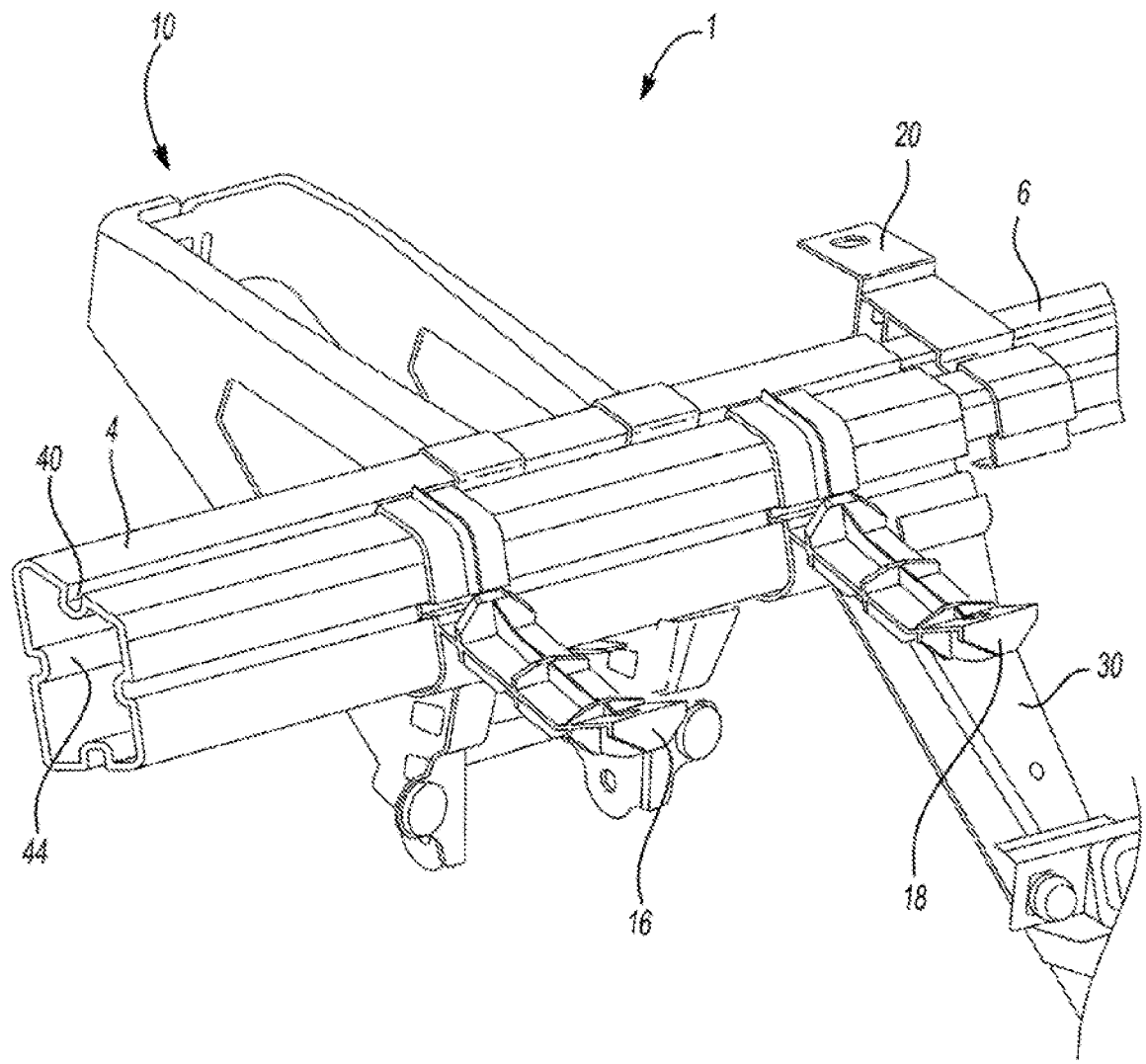
FIG. 5 illustrates a perspective view of the crossmember, support brackets, and steering column support.

FIG. 5 illustrates a perspective view of the first beam 4 connected with the steering column support 10, the first structural arm 30, and the second beam 6. Attached to the first beam 4 are mounting arms 16 and 18. The mounting arms 16 and 18 may be used to support panels, dash board components, the like, or a combination thereof. Positioning bracket 20 is connected to the second beam 6 and may be used to position the instrument panel assembly, dash panels, the like, or a combination thereof. The mounting arms 16 and 18 and the positioning bracket 20 engage the longitudinal channels located on the first beam 4 and the second beam 6 with the interlocking features 48.

Figure 6:
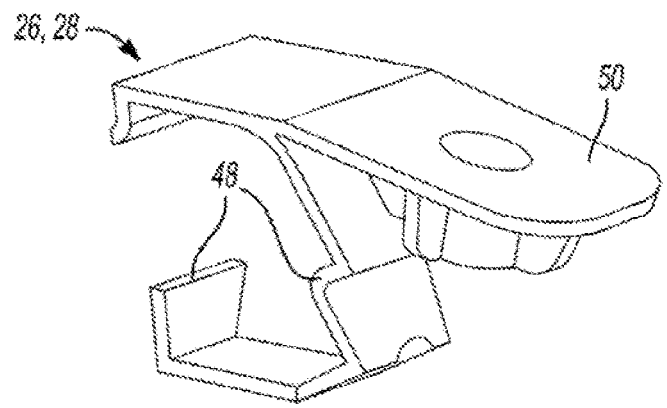
FIG. 6 illustrates one example of a positioning bracket.

FIGS. 6 through 9 illustrate different embodiments of positioning brackets and mounting arms. FIG. 6 shows an example of positioning bracket 26, 28. The positioning bracket includes several interlocking features 48 that engage the top, side, and bottom channels of the second beam. The positioning bracket includes a connection arm 46 with a longitudinal connection tab 50.

Figure 7:
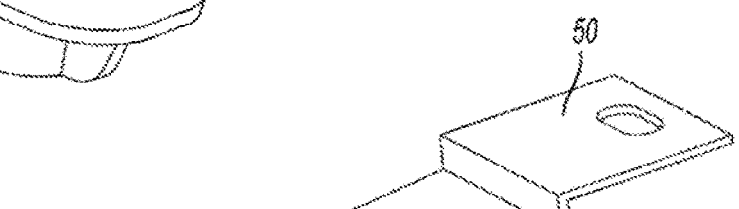
FIG. 7 illustrates another example of a positioning bracket.

FIG. 7 illustrates another example of a positioning bracket 20, 22. The positioning bracket includes several interlocking features 48 designed to engage the longitudinal channels of the second beam. The positioning bracket slides over the second beam along the longitudinal channels. The positioning bracket includes a connection arm 46 with a longitudinal connection tab 50.

Figure 8:
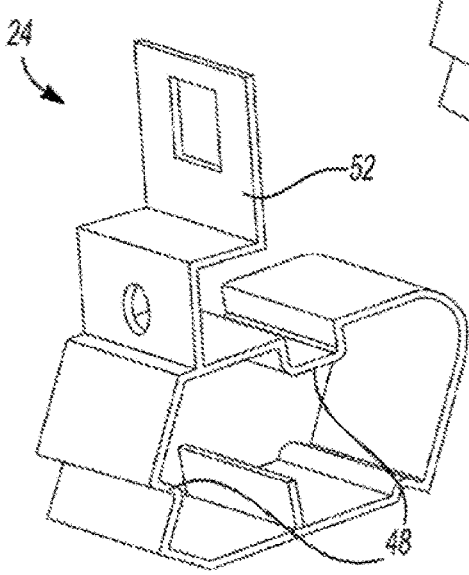
FIG. 8 illustrates a further example of a positioning bracket.

FIG. 8 illustrates a vertical positioning bracket 24. The vertical positioning bracket 24 includes interlocking features 48 that connect into the longitudinal channels 40 of the second beam 6. The vertical positioning bracket 24 includes a connection arm 46 with a vertical connection tab 52, which may be attached to various panels, the vehicle, the like or a combination thereof.

Figure 9:
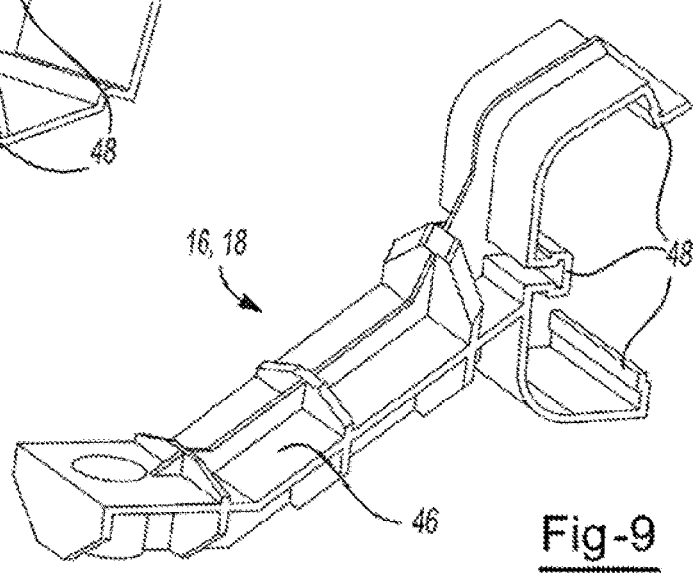
FIG. 9 illustrates a perspective view of a mounting arm.

FIG. 9 illustrates a mounting arm 16, 18. The mounting arm attaches to the first beam 4 with the interlocking features 48 that are positioned within the longitudinal channels of the first beam. The mounting arm includes a connection portion 46 that can be attached to panels, steering accessories, the like, or a combination thereof.

Figure 10:
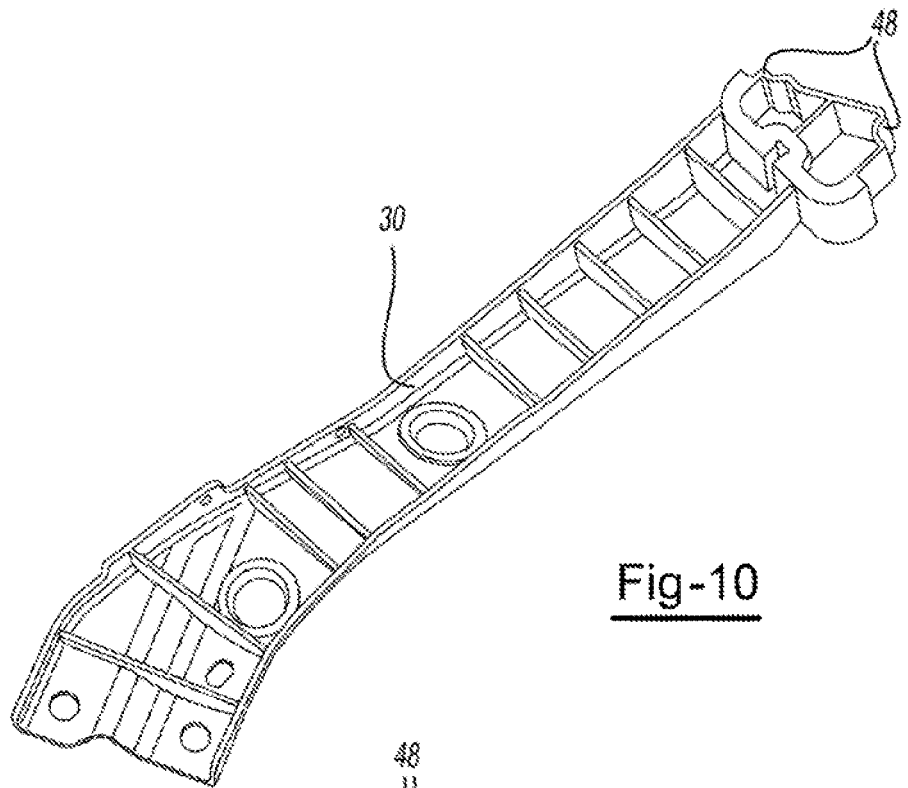
FIGS. 10 and 11 illustrate the structural arms of the center support assembly.

FIG. 10 illustrates the first structural arm 30 of the center support assembly 8.

Figure 11:
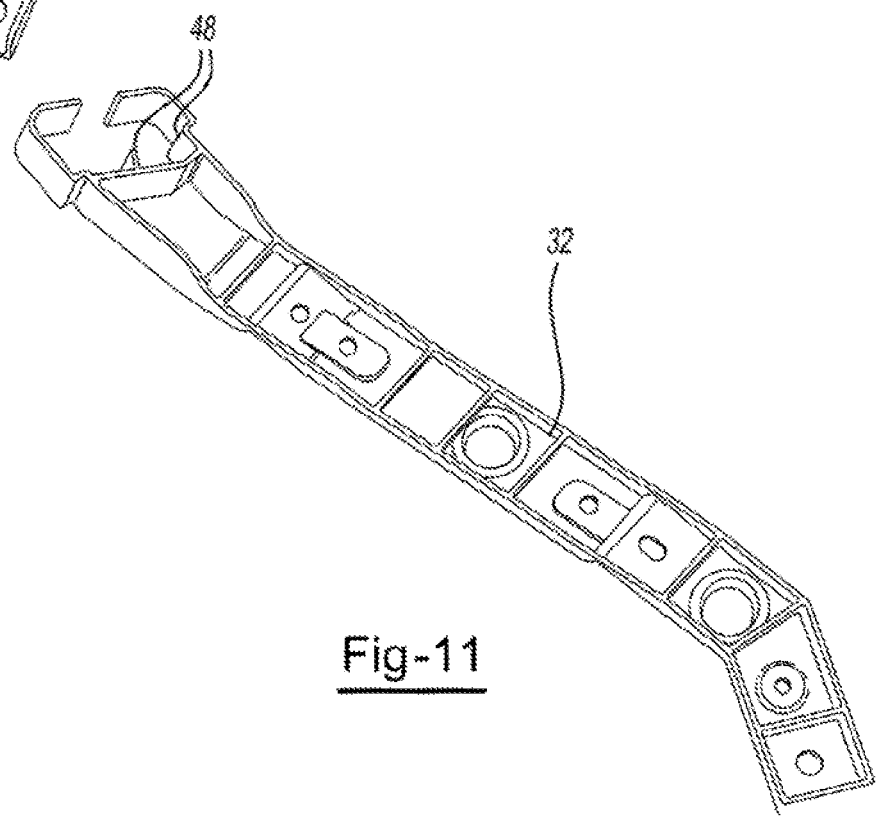

FIG. 11 illustrates the second structural arm 32 of the center support assembly 8. The second structural arm attaches to the second beam by sliding over the exterior to the desired location along the longitudinal channels of the second beam. The second structural arm includes interlocking features 48 that engage the longitudinal channels 40 of the second beam 6.

Figure 12A:
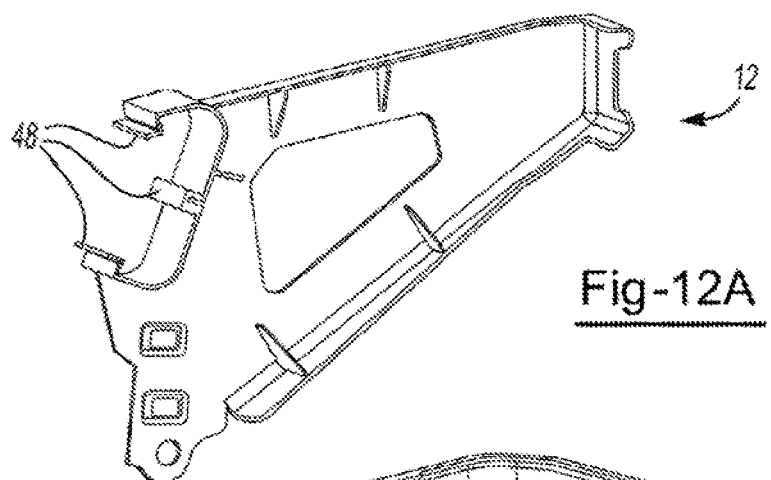
FIGS. 12A and 12B illustrate a first portion and a second portion of the steering column support.
Figure 12B:
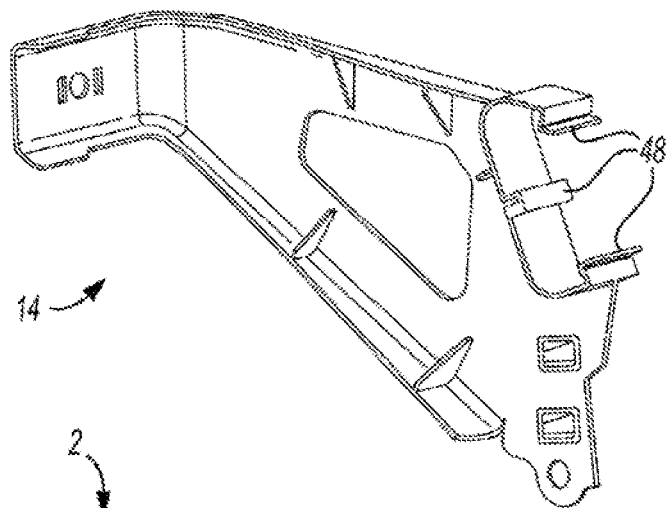

FIGS. 12A and 12B illustrate the first portion 12 and the second portion 14 of the steering column support 10. Both the first portion and the second portion include interlocking features 48 that are inserted into the longitudinal channels 40 of the first beam 4, connecting the steering column support 10 to the crossmember 2.

Figure 13:
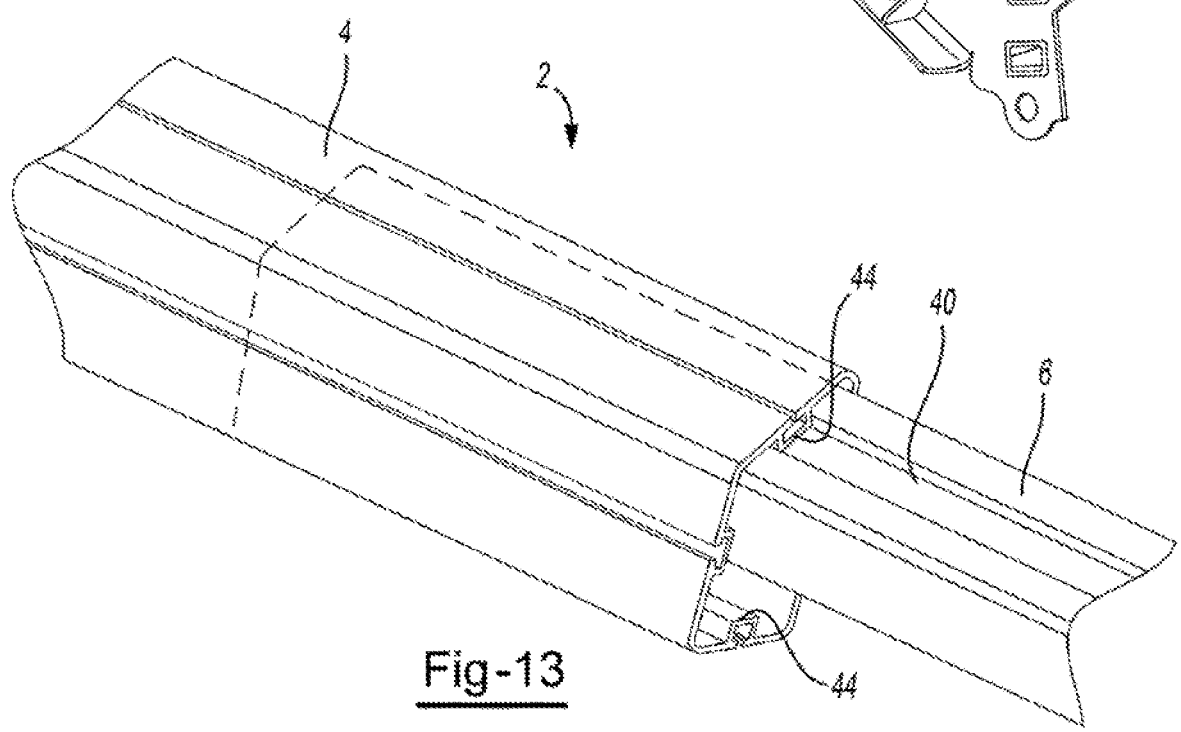
FIG. 13 illustrates a first pultruded beam mated and encompassing a portion of a second pultruded beam.

FIG. 13 illustrates the first beam 4 and the second beam 6 in an overlapping relationship. The second beam 6 is inserted about six inches into the first beam 4. The second beam is approximately half the height of the interior portion of the first beam and spans from one side to the opposite side of the first beam. The first beam 4 includes internal longitudinal protrusions 44 that mate with the external longitudinal channels 40 of the second beam 6.

FIG. 14A-C illustrate mounting bracket 36. The mounting bracket 36 is adapted to connect with the first beam, the second beam, or both. The mounting bracket 36 includes interlocking features 48. The interlocking features are designed to slide into and lock within the longitudinal channels of the first beam, the second beam, or both. The mounting bracket 36 also includes several mounting tabs 54, 56. The mounting tabs 54, 56 may be used to connect the mounting brackets to a portion of the vehicle.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. An instrument panel assembly comprising a crossmember including first pultruded beam and second pultruded beam, wherein the first pultruded beam includes a hollow portion that receives a portion of the second pultruded beam; and
   wherein one or more of the first beam and the second beam include one or more longitudinal channels on an exterior surface, wherein the one or more longitudinal channels of the first beam form one or more internal protrusions on an inner surface of the first beam.

2. An instrument panel assembly comprising a crossmember including first pultruded beam and second pultruded beam, wherein the first pultruded beam includes a hollow portion that receives a portion of the second pultruded beam includes a center support assembly comprising a first structural arm, a second structural arm, and a center support bracket; and
   wherein the first structural arm of the center support assembly and the second beam complement each other when inserted into the first beam, engaging one or more internal protrusions of the first beam, and filling a portion of an interior of the first beam.

3. The instrument panel assembly of claim 2, wherein the second structural arm engages one or more longitudinal channels on the second beam with one or more interlocking features, the one or more interlocking features fit inside the one or more longitudinal channels, securing the second structural arm to the second beam.

4. The instrument panel assembly of claim 1, including a plurality of molded polymeric positioning brackets.

5. The instrument panel assembly of claim 2, including a plurality of molded polymeric positioning brackets.

6. The instrument panel of claim 1, wherein the first pultruded beam and second pultruded beam comprise a fiber reinforced polyurethane.

7. The instrument panel of claim 2, wherein the first pultruded beam and second pultruded beam comprise a fiber reinforced polyurethane.

8. The instrument panel of claim 4, wherein the positioning brackets are molded onto the first beam and/or second beam in a separate injection molding step.

9. The instrument panel of claim 5, wherein the positioning brackets are molded onto the first beam and/or second beam in a separate injection molding step.

10. The instrument panel of claim 1, wherein one or more of the first beam and second beam have a substantially square cross-section.

11. The instrument panel of claim 1, wherein the second beam is substantially hollow.

12. The instrument panel of claim 1, wherein the first beam overlaps the second beam by about 1 inch to about 10 inches.

13. The instrument panel of claim 1, wherein the first beam overlaps the second beam by about 2 inches to about 7 inches.

14. The instrument panel of claim 2, wherein one or more of the first beam and second beam have a substantially square cross-section.

15. The instrument panel of claim 2, wherein the second beam is substantially hollow.

\* \* \* \* \*